March 6, 1962  M. KNOBEL  3,023,822
OVER-UNDER RECORDER FOR WEIGHING
Filed Dec. 31, 1956  3 Sheets-Sheet 1
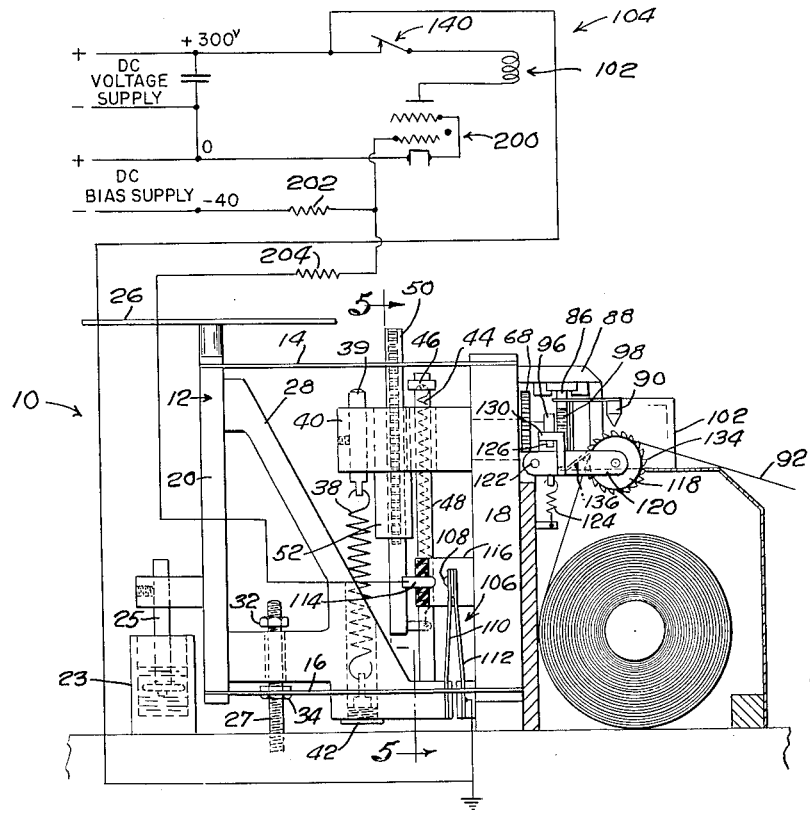
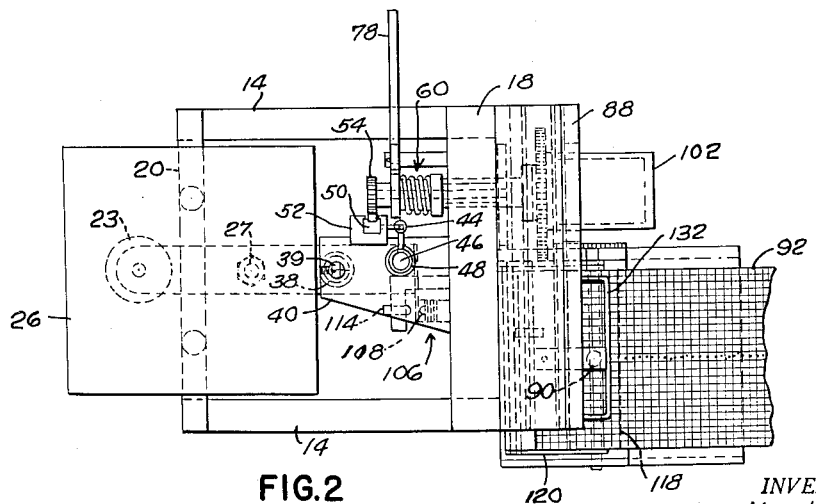
INVENTOR.
Max Knobel
BY Robert R. Churchill
ATTORNEY March 6, 1962  M. KNOBEL  3,023,822
OVER-UNDER RECORDER FOR WEIGHING Filed Dec. 31, 1956  3 Sheets-Sheet 2

INVENTOR.
Max Knobel
BY Robert D. Churchill
ATTORNEY

March 6, 1962    M. KNOBEL    3,023,822
OVER-UNDER RECORDER FOR WEIGHING
Filed Dec. 31, 1956    3 Sheets-Sheet 3

INVENTOR.
Max Knobel
BY Robert R. Churchill
ATTORNEY

United States Patent Office 3,023,822
Patented Mar. 6, 1962

3,023,822
AN OVER-UNDER RECORDER FOR WEIGHING
Max Knobel, Boston, Mass., assignor to Pneumatic Scale Corporation, Limited, Quincy, Mass., a corporation of Massachusetts
Filed Dec. 31, 1956, Ser. No. 631,802
9 Claims. (Cl. 177—2)

This invention relates to a check weighing machine.

The invention as for an object to provide a novel and improved check weighing machine which is characterized by novel, simple and efficient check weighing mechanism capable of accurately and rapidly determining the weight of successive loads being check weighed with relation to a predetermined desired weight.

A further object of the invention is to provide a novel and improved check weighing machine of the character specified having provision for determining the weight of successive loads being check weighed in response to minute deflection of the weighing element and wherein such minute deflection may be translated into proportionately greater movement for graphically or visibly indicating the weight of successive loads with relation to a predetermined desired weight in a rapid and accurate manner.

Another object of the invention is to provide novel and improved check weighing apparatus of the character specified wherein a gradually increasing auxiliary deflecting force is applied to the weighing element until a predetermined deflecting force is reached, the value of such auxiliary force in addition to the effective deflecting force applied by the load to effect deflection of the weighing element providing a measure of the weight or deviation in weight with relation to a predetermined desired weight.

With these general objects in view and such others as may hereinafter appear, the present invention consists of the novel and improved check weighing machine and in the structures, arrangements and combinations of parts hereinafter described and more particularly defined in the claims at the end of this specification.

In the drawings illustrating the preferred embodiment of the invention:

FIG. 1 is a side elevation partly in cross section of the present check weighing machine including a wiring diagram forming a part of the control mechanism;

FIG. 2 is a plan view of the check weighing machine illustrated in FIG. 1;

Figure 3:
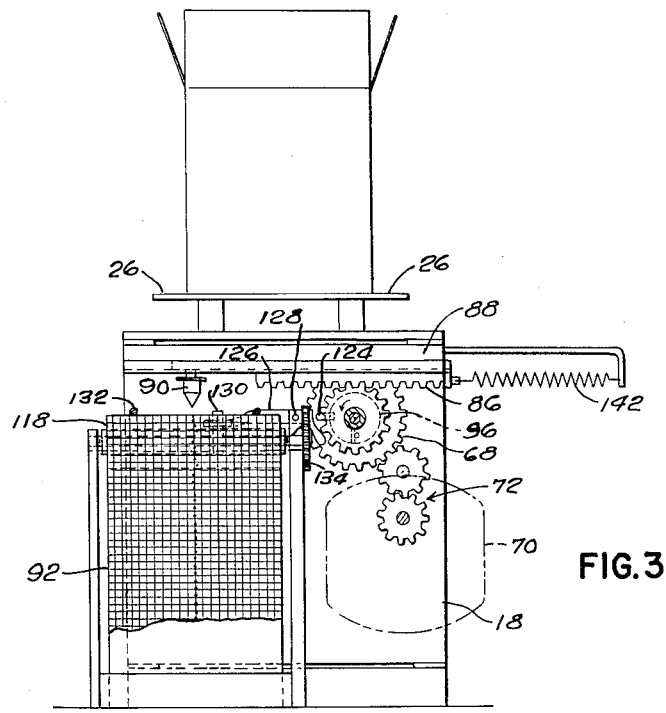
FIG. 3 is a front elevation of the present check weighing machine as viewed from the right in FIG. 1.

In general the present check weighing machine contemplates novel and improved check weighing mechanism wherein provision is made for determining the weight of successive loads being check weighed with relation to a predetermined desired weight and for rapidly and accurately recording or indicating such weights. The present check weighing mechanism preferably embodies a deflectable weighing element preferably of the spring beam type wherein during the check weighing operation the deflection of the weighing element in performing the weighing operation may be measured in thousandths of an inch. In the preferred embodiment of the invention provision is made for independently applying an auxiliary and gradually increasing deflecting force on the weighing element, the auxiliary force applying means being operatively connected to a linearly movable member capable of movement through a relatively long distance and proportionate to the weight of the load being check weighed whereby to effect deflection of the weighing element when a predetermined deflection force is reached. Provision is also made for terminating the movement of said linearly movable member in response to the minute deflection of the weighing element, the extent of such movement being proportionate to the weight of the load whereby to indicate either graphically or visibly the weight or deviation in weight from or with relation to a predetermined desired weight. Thus, in operation when the load being check weighed requires a relatively small auxiliary deflecting force applied to the weighing element the linearly movable member will be moved a proportionately small distance relative to a predetermined correct weight distance indicating that the load is overweight, and conversely, when the load requires a relatively great amount of auxiliary deflecting force the linearly movable member will be moved a proportionately long distance indicating that the load is underweight.

Referring now to the drawings illustrating the preferred embodiment of the present invention and to FIG. 1 in particular, 10 represents the present check weighing mechanism including a weighing element 12 of the spring beam type having two pairs of relatively stiff leaf springs 14, 16 secured at one end to a stationary portion 18 of the machine frame. A tie bracket 20 is connected in fixed relation to the free ends of springs 14, 16 and is provided at its upper end with a load supporting platform 26 upon which a load to be check weighed may be supported. As illustrated, platform 26 is preferably disposed above the upper pair of leaf springs 14. However, it may be secured in any suitable position to the tie bracket 20. In order to prevent and to damp any vibrations or oscillations of the weighing element which may occur during a check weighing operation a dash pot 23 having a piston 25 secured at one end to the bracket 20 is provided. Piston 25 is arranged to be movable in a body of oil within the dash pot in response to movements of the weighing element. The amount of movement of the weighing element may and preferably will be limited by a stop member consisting of a rod 27 extended through a clearance opening in a bracket arm 28 secured to and movable with the tie bracket 20. The rod 27 is secured to the machine frame and extended above the bracket arm 28. Movement of weighing element 12 is adjustably limited by nuts 32, 34 positioned upon rod 27 above and below the arm 28 as shown. The limitation upon the movement of the weighing element may be varied by providing more or less clearance between nuts 32, 34 and the bracket arm 28.

In order to adjust the weighing element to check weigh loads of varying weights a coil spring 38 is secured at one end to an adjustable bolt 39 carried by a supporting block 40 attached to the stationary portion 18 of the machine frame. The opposed end of the spring 38 is secured to an adjustable screw 42 attached to the arm 28 integral with weighing element 12. The tension on the spring may be adjusted to support the majority of the weight of the load being check weighed and in this manner only a relatively small amount of the load is reflected in the deflection of the weighing element. For example, if it is desired to check weigh a load weighing 16 ounces the spring member 38 may be adjusted to provide a tension which will support a load of 14 ounces so that the differential weight of 2 ounces or any deviation therefrom between the load and the spring tension of 14 ounces will be effective to apply a deflecting force on the weighing element. In this manner the check weighing operation may be greatly speeded up and the degree of accuracy of the weighing operation substantially increased.

In accordance with the present invention an additional or auxiliary gradually increasing deflecting force is arranged to be applied to the cantilever weighing element during the check weighing operation so that such variable deflecting force together with the effective deflecting force of the load being check weighed will effect deflection of the weighing element when a predetermined deflecting force is reached, and provision is made for translating such auxiliary deflecting force into linear movement, the extent of which indicates the weight of the load. As herein shown, the auxiliary deflecting force may be independently applied to the cantilever weighing element by a spring 44 connected at its upper end to a collar 46 adjustably mounted on a rod 48 upstanding from the bracket 28, the spring being connected at its lower end to the lower end of a vertical rack 50 mounted for vertical movement in a slide member 52 attached to the supporting block 40 extended from the fixed member 18.

Figure 5:
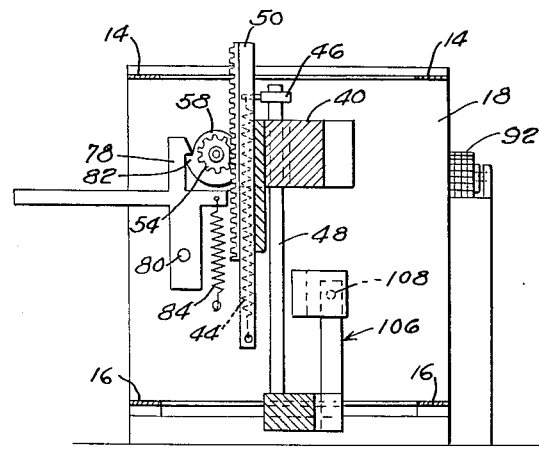
FIG. 5 is a cross sectional view taken on the line 5—5 of FIG. 1.
Figure 8:
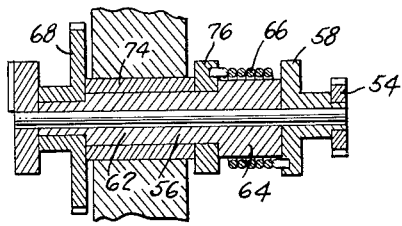
FIGS. 7 and 8 are enlarged detail views in cross section of the spring clutch shown in engaged and disengaged position respectively.

Provision is made for moving the vertical rack downwardly to extend the spring 44 and to thus apply a gradually increasing tension or deflecting force to the weighing element during each check weighing operation, and as herein shown, a segmental pinion 54 in mesh with the rack 50 is mounted fast on a central shaft 56. The pinion 54 is formed integrally with the driven member 58 of a conventional spring coil clutch indicated generally at 60, the driving member of which comprises a sleeve shaft 62 having a drum portion 64 for cooperation with the coil spring 66 wound thereabout and connected at one end to the driven member 58, the other end of the spring being free. The winding of the coil spring 66 is in a direction opposed to the direction of rotation of the sleeve shaft 62, and the inside diameter of the coil spring is such as to normally maintain frictional gripping engagement with the drum portion 64. The sleeve shaft 62 is provided at its other end with a gear 68 arranged to be continuously rotated through driving mechanism including an electric motor 70 and a train of gears indicated at 72. The sleeve shaft 62 is mounted for rotation in a bushing 74 extended through the supporting member 18 and is also provided with a collar 76 loosely mounted thereon. The spring coil clutch 60 comprises a one revolution clutch, and as shown in FIG. 5 is arranged to be manually controlled by a latch member 78 pivotally mounted at 80 and provided with a hook portion adapted to engage a tooth 82 formed on the driven member 58 to bring it to rest at the end of one revolution. A spring 84 is connected to the pivoted member 78 to urge it into latching position. In operation when the latch member 78 is in its latched position the coil spring 66 which is normally in gripping engagement with the continuously rotated drum portion 64 is released from gripping engagement by the frictional contact of the drum being rotated in a direction opposite to the direction of the spring winding or in a direcion which tends to unwind the springs, and when the latch member 78 is rocked to free the driven member 58 the coil spring 66 is free to grip the drum portion 64 to be rotated therewith and to effect rotation of the pinion and downward movement of the rack. Thereafter when the member 58 is again brought to rest by the latch member the rotation of the drum again effects a frictional unwinding movement of the free portion of the coil spring so as to release the spring from gripping engagement therewith, thus terminating downward movement of the vertical rack 50. It will be observed that the free end of the clutch spring 66 is connected to the loosely mounted collar 76.

Figure 4:
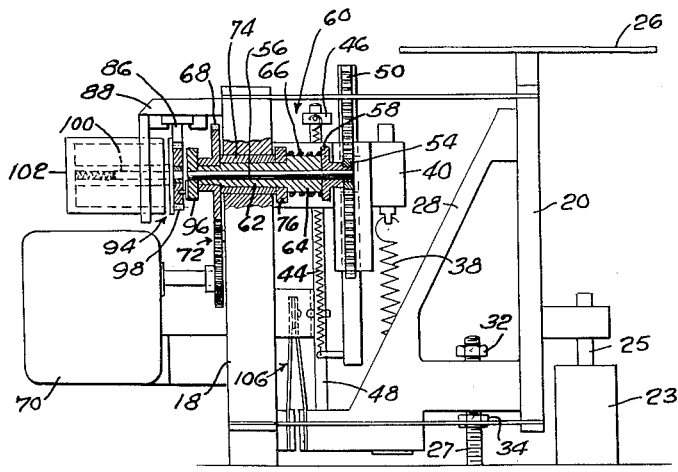
FIG. 4 is a side elevation of the present check weighing machine as viewed from the right in FIG. 3, some of the parts being shown in cross section.

As shown in FIGS. 3 and 4, the central shaft 56 may be operatively connected to a horizontal rack 86 mounted to slide in a bracket 88 carried by the stationary support 18 and provided with a stylus or recording pen 90 arranged to cooperate with a sheet of graph paper 92. The connection between the central shaft 56 and the horizontal rack 86 may include a magnetic clutch brake indicated generally at 94 and which includes a driving member or disk 96 fast on the end of the central shaft 56 and a driven member comprising a gear 98 mounted on the end of a spring pressed armature 100 forming a part of a magnetic coil 102, the gear 98 being in mesh with the horizontal rack 86 as shown. The coil 102 is normally deenergized, and at such time the armature is spring urged outwardly to present a laterally extended pin carried thereby into the path of a radial ridge or projection of the driving disk 96 as shown. Thus, in operation the normally engaged magnetic clutch effects linear movement of the horizontal rack 86 a distance proportional to the movement of the vertical rack 50 which in turn corresponds to the auxiliary deflecting force being applied to the cantilever weighing element 12.

The magnetic coil 102 forms part of a control circuit indicated generally at 104 in FIG. 1, and as herein shown, provision is made for closing the circuit to energize the coil 102 when a predetermined deflection force is reached whereupon the driven member or gear 98 is moved to disengage the gear pin from the radial projection of the driving member 96 to discontinue the linear movement of the horizontal rack, the gear 98 remaining in mesh with the rack 86 and holding the rack in its moved position so long as the coil remains energized. The energized coil thus serves in effect as a brake to lock the horizontal rack 86 in its moved position. The mechanism for closing the circuit 104 when a predetermined deflecting force is applied to the cantilever spring beam, as shown in FIG. 1, includes a resilient contact unit indicated generally at 106 operatively connected to the cantilever weighing element and forming therewith a resilient force measuring device adapted to yield when a predetermined deflecting force is applied to the weighing element. As herein shown, the contact unit 106 forms one contact 108 of a switch included in the circuit 104 and comprises a flat spring leg 110 directly connected at its lower end to the arm 28 and a second flat spring leg 112 connected at its lower end and electrically grounded to a portion of the machine frame 18. The upper ends of the flat spring legs 110, 112 are connected together and provided with the contact 108 comprising the movable member of the switch arranged to cooperate with a stationary contact 114 supported in an insulating bracket 116 attached to the frame member 18. In operation when the cantilever spring beam 12 is in its undeflected position, as shown in FIG. 1, the flat spring legs 110, 112 being of equal length will dispose the contact 108 spaced from the stationary contact 114 to maintain the circuit open, and when the cantilever spring beam is deflected downwardly through a relatively minute distance the downward pull on the leg 110 will effect bending of the leg 112 and movement of the contact end through a relatively greater distance. In practice the resilient contact unit 106 is preferably preset so that a predetermined deflecting force applied to the cantilever beam will effect movement of the resilient contact unit or tripping of the cantilever weighing beam to engage the contacts and close the circuit 104.

From the description thus far it will be seen that there is provided a fixed deflecting point, as determined by the stiffness of the cantilever flat springs 14, 16, the resistance of the resilient contact unit 106 and the tension of the adjustable counterforce spring 38, the cantilever weighing element being adapted to yield when subjected to a deflecting force made up of two variables including the effective deflecting force of the load being check weighed and the gradually increasing auxiliary deflecting force applied to the cantilever beam during the check weighing operation, the amount of auxiliary deflection applied to effect tripping the beam depending on and corresponding to the amount of deviation in the weight of the load and providing an accurate indication of such deviation with relation to a predetermined desired weight. Thus, in operation the extent of linear movement of the horizontal rack 86 when it is stopped by tripping of the beam 12 and closing of the circuit 104 comprises an accurate measure of the weight of the load being check weighed.

As illustrated in FIG. 3, such movement may be indicated graphically by moving the chart paper 92 into contact with the recording pen at this time to make a dot thereon. In operation if the load corresponds to the predetermined desired weight the linear movement of the horizontal rack and its recording pen 90 will be such as to dispose the pen in a central position on the graph paper corresponding to such predetermined desired weight. If the load is less than such predetermined desired weight more auxiliarly deflecting force will be required and the recording pen 90 will be moved beyond such central position indicating an underweight load. Conversely, if the load is more than said predetermined desired weight less auxiliary deflecting force will be required, and the recording pen will be moved to a position short of said central position on the graph paper indicating an overweight load.

Thus, the relatively small deviation in weight of successive loads as measured by the gradually increasing deflecting force may be greatly amplified to provide an accurate indication of the weights of successive loads being check weighed. As illustrated, the spring 44 may be adjusted by moving the collar 46 on the rod 48 to vary the deflecting force. It will be understood that upon disengagement of the magnetic clutch 94 and locking of the horizontal rack 86 in its moved position, the vertical rack 50 continues its downward movement through its full cycle after the cantilever beam 12 has been tripped, its downward movement being terminated when the driven member 58 of the clutch 60 is engaged by the latch member 78. As illustrated in FIG. 5, the teeth of the pinion 54 may be discontinued or cut off on one side forming a segmental pinion presenting a flat surface of the pinion against the rack teeth at the end of the cycle, such position of the pinion relative to the rack corresponding to the stop position so as to leave the vertical rack free at this time to return to its initial upward position by virtue of the spring 44.

As herein shown, the graph paper 92 may be provided in roll form and is arranged to pass over a feed roll 118 mounted between the arms of a bracket 120 pivotally mounted at 122. The bracket 120 is urged downwardly against a suitable stop by a spring 124 and is arranged to be rocked upwardly to present the paper to the recording pen 90 at the end of each cycle of operation by connections from the driving member 96 carried by the central shaft 56. As shown in FIG. 3, the member 96 is provided with a radial pin 124 arranged to engage the tail of an arm 126 pivotally mounted at 128 to rock the arm in a clockwise direction, the other end of the arm 126 being engaged under a hook or angle member 130 attached to the roll supporting bracket 120 to rock the same upwardly. The graph paper 92 may be frictionally held in engagement with the roll 118 by a spring arm 132 which may be curved to fit around a portion of the roll and yieldingly press the paper against the roll. As shown in FIG. 1, in order to rotate the roll 118 and advance the paper 92 a small increment each cycle of operation, the roll is provided at one end with a ratchet 134 arranged to cooperate with a stationary leaf spring pawl 136 so that in operation successive teeth of the ratchet are engaged and advanced each time the roll 118 is rocked upwardly as described. Thus, a graphic record of the weight of successive loads is provided to indicate any trend toward overweight or underweight loads so that the filling or weighing machine producing the loads may be readjusted accordingly.

In operation the central shaft 56 and its driving member 96 is caused to rotate through one revolution each cycle of operation and is automatically brought to rest by the latch member 78, the coil spring clutch 60 being thus disengaged and the vertical rack 50 returned to its upward position, as described, in readiness for a succeeding cycle of operation. At this time, the cantilever weighing beam 12 also returns to its normal undepressed position to open the circuit at the resilient contact switch 106. The control circuit 104 comprises a holding circuit arranged to maintain the magnetic coil 102 energized after the resilient contact switch 106 is opened so that the position of the recording pen 90 may be maintained until a switch 140 in the circuit 104 is operated to deenergize the coil 102 whereupon the spring pressed armature 100 again effects engagement of the gear 98 with the driving member 96 fast on the central shaft 56. Upon deenergization of the coil 102, the horizontal rack 86 is returned to its initial retracted position by a spring 142 and also rotates the gear 98 back to its initial position to present its pin in driving engagement with the radial projection of the driving member 96 in readiness for a new cycle of operation. The new cycle is initiated by manually rocking the latch member 78 to effect engagement of the coil spring clutch 60, as described after placing a new load to be check weighed on the platform 26.

It will be apparent that the semi-automatic apparatus, herein described, having provision for manually controlling the clutch engaging and circuit breaking elements may be replaced by cam operated controls in a fully automatic machine. The present electrical control circuit illustrated in FIG. 1 may be described as follows: The actuation of the clutch brake coil 102 by closing contacts 108 and 114 may be done in many ways, the most simple being to have the clutch current pass directly through these contacts, or to use conventional electromechanical relays. It is preferred, however, to use an electric tube whereby the contacts pass only the minute current necessary to change the grid potential of such tubes. Illustrated is a circuit 104 for a gas type of tube (thyratron) which has the property of suddenly conducting when the grid arrives at a certain potential, and thereafter is no longer under control of the grid. The tube 200 has is grid held negative by the D.C. bias supply through resistor 202 which may be a megohm or so. Under these conditions the tube does not conduct. When contact is made between 108 and 114 it is seen the grid potential will be somewhere between plus 300 volts and minus 40 volts, the actual value determined by resistors 202, 204, and may be made amply positive to insure the grid will start conduction in the tube 200. This tube current passes through the clutch coil 102 and energizes it. When later, as described above, contacts 108 and 114 separate and the tube circuit is broken by opening 140, the tube returns to its non-conducting state ready for the next cycle.

Figure 6:
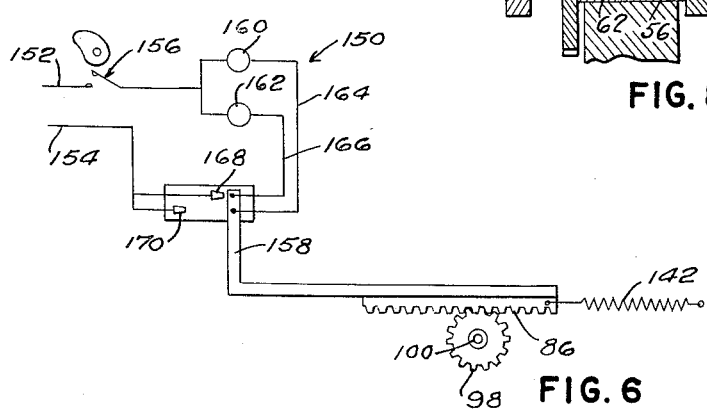
FIG. 6 is a diagrammatic view of a modified form of weight indicating mechanism embodied in the present check weighing mechanism.
Figure 7:
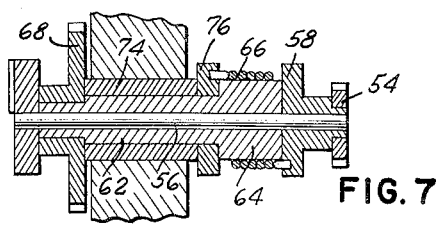

In a modified form of the invention illustrated in FIG. 6 the linear movement of the horizontal rack 86 may be arranged to cooperate with a signal circuit 150 for visually indicating the over and underweight loads being check weighed. As herein illustrated, the current flows through the inlet and outlet lines 152, 154, the flow being controlled by cam operated switch 156 of conventional design in line 152. In practice the cam may be timed to operate the switch 156 at a time in the cycle when the check weighing operation is completed and the rack 86 is at rest in its moved position.

In order to visually indicate whether or not a load being check weighed is over or under a predetermined weight one end of the horizontal rack member 86 is connected to an arm 158 movable with the rack. The line 152 is wired in a parallel circuit in each branch of which one of the lamps 160, 162 is disposed. Each branch 164, 166 is connected to the arm 158 as shown. Line 154 is connected to each one of the over and underweight fixed contacts 168, 170. During the check weighing operation if a load being weighed is under a predetermined weight the arm 158 will be moved a relatively long distance passing contact 168 and coming to rest to make contact with the underweight fixed contact 170, thereby closing the circuit to underweight lamp 160 causing it to light and indicate that the load weighed is underweight when the cam operated switch 156 is closed. If the load is over a predetermined weight the arm 158 will be moved a relatively short distance to come to rest and to make contact with overweight fixed contact 168 closing the circuit to and lighting the overweight lamp 162 when switch 156 is closed. Should the arm 158 stop in an intermediate position between the two contacts 168, 170 a substantially correct weight within commercial tolerances is indicated and neither lamp will be lit. In this manner the weight of the loads being check weighed over or under a predetermined weight may be easily determined.

From the foregoing description it will be apparent that the present novel and improved check weighing mechanism enables the weight of successive loads check weighed to be recorded in a rapid, accurate and highly efficient manner, provision also being made for visually indicating whether a load is over or under a predetermined weight. It will be apparent that the effective force applied by the gradually increasing deflecting mechanism to trip the weighing element varies inversely with respect to the effective deflecting force applied by the load being check weighed so as to provide an accurate indication of the weight of the load with respect to a predetermined desired weight.

While the preferred embodiment of the invention has been herein illustrated and described, it will be understood that the invention may be embodied in other forms within the scope of the following claims.

Having thus described the invention, what is claimed is:

1. Check weighing apparatus comprising, in combination, a deflectable weighing element having means for supporting a load to be check weighed, said weighing element being movable through a minute distance and reaching a predetermined position when a predetermined deflecting force is applied thereto, said deflectable weighing element comprising a cantilever weighing beam including a rigid support, a plurality of vertically spaced and parallel stiff leaf springs fastened at one end to said support, a tie piece connecting leaf springs at the other end, a load support attached to said tie piece, and a counterforce coil spring cooperating with said stiff leaf springs to support a portion of the weight of the load, independently operated auxiliarly deflecting means including a second coil spring operatively connected to the weighing element and means for extending said second coil spring to apply a gradually increasing deflecting force thereto to aid the deflection due to the load, said auxiliary deflecting means being movable through a relatively long distance proportionate to the additional deflecting force required above the weight of the load to effect deflection of the weighing element, weight indicating means including, a movable weight indicating member, and operating connections engageable and disengageable with said auxiliary deflecting means to effect movement therewith, means cooperating with said movable member for indicating the extent of movement of said member, an electrical circuit including a preset resilient contact unit operatively connected to the weighing element arranged to be actuated to close the circuit upon deflection of the weighing element, said preset resilient contact unit comprising a snap action switch adapted to close suddenly at a predetermined force and electroresponsive control means in said circuit actuated in response to closing of said circuit for disengaging said operating connections to the weight indicating member to terminate the movement thereof, the extent of movement of said member indicating the weight of the load with relation to a predetermined desired weight, the weight applied being always less than the load needed to deflect the beam to contact closing position.

2. Check weighing apparatus as defined in claim 1 wherein the means of extending said second coil spring includes a vertical rack connected to said spring, a segmental pinion in mesh with said rack, means for driving said pinion including a continuously rotating element and a one revolution clutch connecting the pinion to said continuously rotating element, said weight indicating member including a horizontal rack and said operating connections including a second pinion in mesh with said horizontal rack, said second pinion forming a part of said electroresponsive control means and being normally in driving engagement with said segmental pinion, said second pinion being moved out of driving engagement with said segmental pinion upon actuation of said electroresponsive means.

3. Check weighing apparatus as defined in claim 1 wherein the effective force applied by the gradually increasing deflecting means to effect deflection of the weighing element varies inversely with respect to the effective deflecting force applied by the load being check weighed whereby to accurately measure any deviations in the load from a predetermined desired weight.

4. Check weighing apparatus as defined in claim 1 wherein the preset resilient contact unit comprises a pair of leaf springs joined together at their upper ends and connected at their lower ends to a stationary support and to the weighing element respectively, deflection of the weighing element through a minute distance effecting a corresponding downward pull on its connected leg and causing a rocking movement of the other leg through a relatively greater distance.

5. Check weighing apparatus as defined in claim 1 which includes recording means cooperating with said movable member in its terminated position for recording the weight of the load being check weighed with relation to a predetermined desired weight.

6. Check weighing apparatus as defined in claim 1 which includes signal means cooperating with said movable member in its terminated position for visibly indicating underweight and overweight loads with respect to a predetermined desired weight.

7. Check weighing apparatus as defined in claim 2 wherein the electroresponsive means includes a magnetic coil having an armature upon which said second pinion is mounted to be moved into and out of driving engagement with said segmental pinion, energization of said magnetic coil effecting movement of the second pinion out of driving engagement with said segmental pinion and also effecting locking of the second pinion to maintain the horizontal rack in its moved and weight indicating position.

8. Check weighing apparatus as defined in claim 7 wherein said electrical circuit includes a switch arranged to be opened to deenergize said magnetic coil and release said second pinion and horizontal rack at the end of a check weighing operation, and a spring connected to the rack for returning the same to its retracted position and for rotating said pinion to its initial position for driving engagement with said segmental pinion.

9. Check weighing apparatus as defined in claim 8 wherein said segmental pinion is rotated through one revolution each cycle to present a non-meshing portion to said vertical rack at the end of each check weighing cycle to permit the vertical rack to be returned to its initial position by its coil spring.

References Cited in the file of this patent

UNITED STATES PATENTS

| | | |
|---|---|---|
| 1,469,987 | Bryce | Oct. 9, 1923 |
| 1,893,205 | Hughes | Jan. 3, 1933 |
| 2,352,005 | Popov | June 20, 1944 |
| 2,688,477 | Lindars | Sept. 7, 1954 |
| 2,739,803 | Carton | Mar. 27, 1956 |
| 2,793,026 | Giardino et al. | May 21, 1957 |